US012194387B2

(12) United States Patent
Bean et al.

(10) Patent No.: US 12,194,387 B2
(45) Date of Patent: Jan. 14, 2025

(54) USER SENTIMENT DETECTION TO IDENTIFY USER IMPAIRMENT DURING GAME PLAY PROVIDING FOR AUTOMATIC GENERATION OR MODIFICATION OF IN-GAME EFFECTS

(71) Applicant: Sony Interactive Entertainment Inc., Tokyo (JP)

(72) Inventors: Celeste Bean, San Francisco, CA (US); Victoria Dorn, Hayward, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 121 days.

(21) Appl. No.: 17/875,340

(22) Filed: Jul. 27, 2022

(65) Prior Publication Data
US 2024/0033640 A1   Feb. 1, 2024

(51) Int. Cl.
*A63F 13/67*    (2014.01)
*A63F 13/5375*  (2014.01)
*A63F 13/79*    (2014.01)
*G06V 10/70*    (2022.01)
*G06V 40/16*    (2022.01)

(52) U.S. Cl.
CPC .......... *A63F 13/67* (2014.09); *A63F 13/5375* (2014.09); *A63F 13/79* (2014.09); *G06V 10/70* (2022.01); *G06V 40/168* (2022.01); *A63F 2300/305* (2013.01); *A63F 2300/5546* (2013.01); *A63F 2300/6027* (2013.01)

(58) Field of Classification Search
None
See application file for complete search history.

(56) References Cited

U.S. PATENT DOCUMENTS

| | | | |
|---|---|---|---|
| 2017/0083086 A1* | 3/2017 | Mazur | G06F 3/04812 |
| 2017/0259177 A1* | 9/2017 | Aghdaie | G06N 7/01 |
| 2020/0135052 A1* | 4/2020 | Singh | A63F 13/52 |
| 2020/0206631 A1* | 7/2020 | Sumant | A63F 13/55 |
| 2021/0279449 A1* | 9/2021 | Yamazaki | G06T 7/00 |
| 2021/0322888 A1 | 10/2021 | Arroyo Palacios et al. | |

OTHER PUBLICATIONS

Intl Preliminary Report & Written Opinion PCT/US2023/070000, dated Jul. 11, 2023, total 11 pages.

* cited by examiner

*Primary Examiner* — Jason T Yen
(74) *Attorney, Agent, or Firm* — PENILLA IP, APC

(57) ABSTRACT

A method including executing game logic of a video game to generate a plurality of video frames for a game play of the video game by a player, wherein game state data is generated during the executing the game logic. The method including determining a current context in the game play of the video game based on the game state data. The method including determining a user sentiment of the player towards the current context in the game play of the video game. The method including determining that the user sentiment of the player is inconsistent with an expected user sentiment for the current context. The method including generating an in-game effect for the current context. The method including presenting the in-game effect simultaneous with one or more video frames associated with the current context in the game play of the video game.

19 Claims, 6 Drawing Sheets

USER SENTIMENT DETECTION TO IDENTIFY USER IMPAIRMENT DURING GAME PLAY PROVIDING FOR AUTOMATIC GENERATION OR MODIFICATION OF IN-GAME EFFECTS

TECHNICAL FIELD

The present disclosure is related to gaming, and more specifically to providing overlay logic supporting a game engine to detect user sentiment during game play of a video game and automatically provide in-game effects to make the video game more interesting or intense when the user sentiment is unexpected for a current context in the game play. Also, artificial intelligence models can be built for players that are configured to predict user sentiments for corresponding players.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

Video games are known to provide an immersive experience to players. For example, a video game may provide audio effects in a given scene to accentuate the experience of the player. However, a hearing impaired player may be unable to fully experience and/or appreciate the audio effects. Furthermore, sub-titling in the video game may be inadequate or cumbersome to use during game play, such that the player is unable to comprehend in a timely manner what the sub-titling is trying to convey. As a result, the hearing impaired player will not have the same experience playing the video game as a non-impaired player. For example, the hearing impaired player may not feel the same urgency when playing the video game through a scene as a non-impaired player that is able to hear the audio effects. In other cases, the hearing impaired player may not truly understand what is occurring (e.g., that something important prominent in the scene is occurring in the background) or what is expected from the player (e.g., to go in a certain direction) during the game play of a video game.

It would be desirable to increase accessibility of video games to impaired players, so that impaired players would have the same or similar experiences as non-impaired players when playing the video games.

It is in this context that embodiments of the disclosure arise.

SUMMARY

Embodiments of the present disclosure relate to providing overlay logic supporting a game engine to detect user sentiment during game play of a video game, especially for players that may be physically impaired (e.g., hearing impaired, etc.). When the user sentiment is unexpected for a current context of the game play, the overlay logic is configured to provide in-game effects to make the video game more interesting or intense to more accurately communicate to the user what is occurring during the game play. For example, an in-game effect may be translated from sub-titling to convey to the user that an intense explosion is occurring. While normally the hearing impaired user may be unaware of the urgency presented in the game play, the newly generated in-game effects allow the player to be more fully aware of the explosions occurring, and the player may experience the intended urgency that should be triggered by those explosions. In that manner, a hearing impaired player may enjoy a game experience that is similar to the game experience of a non-impaired player hearing the sound effect.

In one embodiment, a method is disclosed. The method including executing game logic of a video game to generate a plurality of video frames for a game play of the video game by a player, wherein game state data is generated during the executing the game logic. The method including determining a current context in the game play of the video game based on the game state data. The method including determining a user sentiment of the player towards the current context in the game play of the video game. The method including determining that the user sentiment of the player is inconsistent with an expected user sentiment for the current context. The method including generating an in-game effect for the current context. The method including presenting the in-game effect simultaneous with one or more video frames associated with the current context in the game play of the video game.

In another embodiment, a non-transitory computer-readable medium storing a computer program for implementing a method is disclosed. The computer-readable medium including program instructions for executing game logic of a video game to generate a plurality of video frames for a game play of the video game by a player, wherein game state data is generated during the executing the game logic. The computer-readable medium including program instructions for determining a current context in the game play of the video game based on the game state data. The computer-readable medium including program instructions for determining a user sentiment of the player towards the current context in the game play of the video game. The computer-readable medium including program instructions for determining that the user sentiment of the player is inconsistent with an expected user sentiment for the current context. The computer-readable medium including program instructions for generating an in-game effect for the current context. The computer-readable medium including program instructions for presenting the in-game effect simultaneous with one or more video frames associated with the current context in the game play of the video game.

In still another embodiment, a computer system is disclosed, wherein the computer system includes a processor and memory coupled to the processor and having stored therein instructions that, if executed by the computer system, cause the computer system to execute a method. The method including executing game logic of a video game to generate a plurality of video frames for a game play of the video game by a player, wherein game state data is generated during the executing the game logic. The method including determining a current context in the game play of the video game based on the game state data. The method including determining a user sentiment of the player towards the current context in the game play of the video game. The method including determining that the user sentiment of the player is inconsistent with an expected user sentiment for the current context. The method including generating an in-game effect for the current context. The method including presenting the in-game effect simultaneous with one or more video frames associated with the current context in the game play of the video game.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
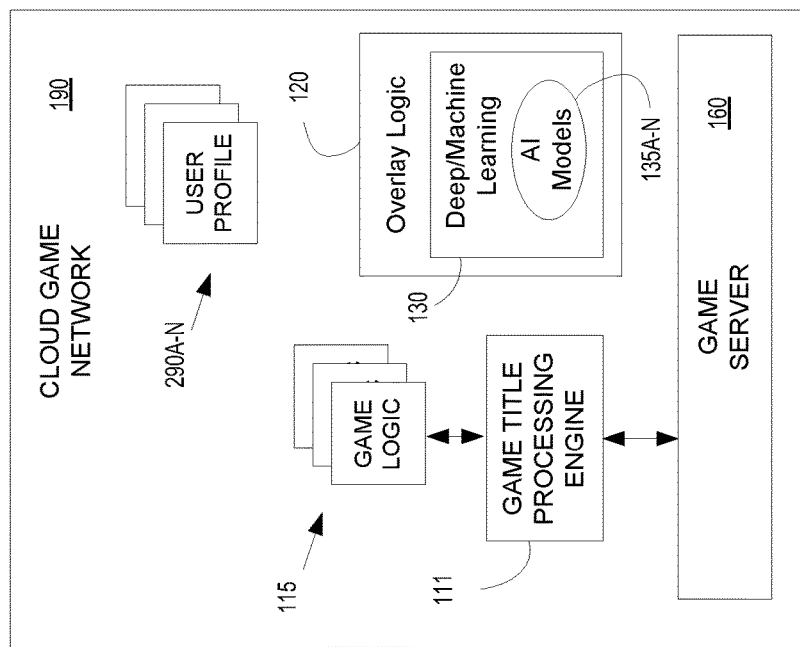
FIG. 1 illustrates a system including overlay logic supporting a game engine to detect user sentiment during game play of a video game and provide in-game effects that automatically convey to a player the proper sentiment for a current context during game play of a video game by a player when the detected user sentiment is unexpected for a current context, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing overlay logic supporting a game engine to detect user sentiment during game play of a video game, especially for players that may be physically impaired (e.g., hearing impaired, etc.), and when the user sentiment is unexpected for a current context of the game play, the overlay logic is configured to provide in-game effects to make the video game more interesting or intense to more accurately communicate to the user what is occurring during the game play. For example, the system is configured to identify when there is problem properly conveying to a player, such as an impaired player (e.g., hearing impaired player, other types of physical impairments, etc.), what is occurring during the corresponding game play of the video game. As an illustration, a hearing impaired player would miss certain audio in the video game, that may also not be fully remedied by the sub-titling provided by the video game, that is intended to convey a full sentiment of the current context of the video game. In that manner, the system can be configured to alter the sub-titling or to provide in-game effects altering or supporting the sub-titling to properly convey to the player the proper sentiment of the current context of the video game. For example, the in-game effects may make the sub-tiling more flashy or unique to make the player pay more attention to the sub-titling, or to provide alternate forms of communicating to the player what the sub-titling is trying to achieve. In that manner, the impaired player may enjoy a gaming experience that is similar to the gaming experience of a non-impaired player. Also, artificial intelligence (AI) techniques may be implemented to predict user sentiments for corresponding players and to determine which in-game effects are preferred by each player.

Advantages of the methods and systems configured to providing overlay logic supporting a game engine to help impaired players understand what is occurring in a video game include providing supporting and/or alternative in-game effects in order to properly communicate an intended gaming experience to the player from playing the video game. As a result, players of video games that may be somehow impaired from having a full gaming experience may now have the same or similar gaming experience as the unimpaired players. In that manner, video games may be made accessible to those impaired players that otherwise may decline to play those video games.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including overlay logic 120 supporting a game engine 111, wherein the overlay logic is configured to detect user sentiment during game play of a video game and provide in-game effects that automatically convey to a player the proper sentiment for a current context during game play of a video game by a player when the detected user sentiment is unexpected for a current context, in accordance with one embodiment of the present disclosure. The overlay logic 120 may be implemented to provide alternative avenues for conveying to the player the proper sentiment or understanding for the current context encountered during the game play, such as through in-game effects that are presented within a scene but are not normally generated during execution of the video game. For example, the in-game effects can include the modification and/or generation of sub-titles, new animation, translation of sub-tiling to an emoticon or animation, etc. In that manner, the impaired player is able to enjoy a game experience and/or understanding of the current context of a video game during a game play that is similar to the game experience and/or understanding of a non-impaired player. In another example, the overlay logic is able to build and/or implement artificial intelligence (AI) models that can predict user sentiments for corresponding players and to determine which in-game effects are preferred by each player. In that manner, the application of newly generated and/or modified in-game effects may be personalized to each player through corresponding AI models. In that manner, the impaired player is able to enjoy a game experience and/or understanding of the current context of a video game during a game play that is similar to the game experience and/or understanding of a non-impaired player.

As shown, system 100 may providing gaming over a network 150 for and between one or more client devices 110. In particular, system 100 may be configured to provide gaming to users participating in single player or multi-player gaming sessions via a cloud game network 190, wherein the video game can be executed locally (e.g., on a local client device of a corresponding user) or can be executed remote from a corresponding client device 110 (e.g., acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc. so that the users in distributed locations participating in a multi-player gaming session can interact with each other in the gaming world or metaverse in real-time.

In particular, system 100 may provide gaming control to one or more users playing one or more applications (e.g., video games) either through local instances operating on client devices or through cloud based instances operating in the cloud game network 190 via network 150 in one or more gaming session. In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

As shown, the cloud game network 190 includes a game server 160 that provides access to a plurality of video games. Video games played in a corresponding single-player or multi-player session may be played over the network 150 with connection to the game server 160. For example, in a multi-player session involving multiple instances of an application (e.g., generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. Game server 160 may be any type of server computing device available in the cloud, and may be configured as one or more virtual machines executing on one or more hosts. For example, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g., video, audio, etc.) of gameplays of a plurality of applications (e.g., video games, gaming applications, etc.) to a plurality of corresponding users. That is, game server 160 is configured to stream data (e.g., rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g., compressed) and streamed to the corresponding client device for display.

Cloud game network includes a plurality of user profiles 290A-N. Each of the user profiles include information related to a corresponding player or user. More particularly, a user profile may include rules and/or a corresponding AI model or parameters for the AI model used for predicting user sentiment and/or for defining preferred in-game effects for corresponding players, for one or more game contexts for example.

In single-player or multi-player gaming sessions, instances of an application may be executing locally on a client device 110 or at the cloud game network 190. In either case, the application as game logic 115 is executed by a game engine 111 (e.g., game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QoS), bandwidth testing, social networking, management of social friends, communication with social networks of friends, social utilities, communication channels, audio communication, texting, messaging, instant messaging, chat support, game play replay functions, help functions, etc.

Users access the remote services with client devices 110, which include at least a CPU, a display and input/output (I/O). For example, users may access cloud game network 190 via communications network 150 using corresponding client devices 110 configured for updating a session controller (e.g., delivering and/or receiving user game state data), receiving streaming media, etc. The client device 110 can be a personal computer (PC), a mobile phone, a netbook, a personal digital assistant (PAD), handheld device, etc.

In one embodiment, client device 110 may be configured with a game title processing engine (also referred to as a "game engine") and game logic for at least some local processing of an application, and may be further utilized for receiving streaming content as generated by the application executing at a back-end server, or for other content provided by back-end server support. In still other embodiments, for independent local processing, the game title processing engine 111 at the client device 110 includes basic processor based functions for executing an application and services associated with the application, as previously described. For local processing, game logic 115 is stored on the local client device 110 and is used for executing the application. For example, an instance of an application is executing by the game title processing engine 111 of a corresponding client device 110. Game logic 115 (e.g., executable code) implementing the application is stored on the corresponding client device 110, and is used to execute the application. For purposes of illustration, game logic 115 may be delivered to the corresponding client device 110 through a portable medium (e.g. optical media) or through a network (e.g., downloaded through the internet from a gaming provider).

In one embodiment, client device 110 may be configured as a thin client providing interfacing with a back end server (e.g., game server 160 of cloud game network 190) configured for providing computational functionality (e.g., including game title processing engine 111). In particular, client device 110 of a corresponding user (not shown) is configured for requesting access to applications over a communications network 150, such as the internet, and for rendering for display images generated by a video game executed by the game server 160, wherein encoded images are delivered (i.e., streamed) to the client device 110 for display in association with the corresponding user. For example, the user may be interacting through client device 110 with an instance of an application executing on a game processor of game server 160 in association with gameplay of a corresponding user, such as through input commands that are used to drive the gameplay. Client device 110 may receive input from various types of input devices, such as game controllers, tablet computers, keyboards, gestures captured by video cameras, mice, touch pads, audio input, etc. More particularly, an instance of the application is executed by the game title processing engine 111 and is configured for generating rendered images, which is delivered over network 150 for display at a corresponding display in association with client device 110. That is, client device 110 is configured for receiving encoded images (e.g., encoded from game rendered images generated through execution of a video game), and for displaying the images that are rendered for display. Game title processing engine 111 is able to support a plurality of applications using a plurality of game logics, each of which is selectable by the user.

In addition, system 100 includes an overlay logic 120 with functionality configured to provide alternative avenues for conveying to the player the proper sentiment or understanding for the current context encountered during the game play, such as through in-game effects that are presented within a scene but are not normally generated during execution of the video game. In that manner, the impaired player is able to enjoy a game experience and/or understanding of the current context of a video game during a game play that is similar to the game experience and/or understanding of a non-impaired player, such as such as when supporting game engines 111 executing the video games. In another example, the overlay logic is able to build and/or implement artificial intelligence (AI) models that can predict user sentiments for corresponding players and to determine which in-game effects are preferred by each player. The application of newly generated and/or modified in-game effects may be personalized to each player through rules and/or corresponding AI models, in various embodiments. As shown, overlay logic 120 may be located at the cloud game network 190 or may be located at the client device 110, and may be configured to support a corresponding game engine 111. For example, when the game engine 111 executing game logic of a video game is at the client device 110, then the overlay logic 120 is also located at the client device 110 and operates in support of the game engine. Also, when the game engine 111 is at the cloud game network 190, then the overlay logic 120 is also located at the cloud game network 190 operating in support of the game engine.

In some embodiments, the overlay logic 120 includes artificial intelligence (AI) to include a deep/machine learning engine 130 configured build or train and implement an AI model (e.g., AI models 135A-N) for each of a plurality of users and/or players. In one embodiment, the AI learning model is a machine learning model configured to apply machine learning to identify features from input data (e.g., gaze tracking data, game state data, etc.) that can be classified and/or labeled to learn and/or predict user sentiments and to determine which in-game effects are preferred by each player for each of a plurality of types of game contexts. In another embodiment, the AI learning model is a deep learning model configured to apply deep learning to identify features from input data (e.g., gaze tracking data, game state data, etc.) that can be classified and/or labeled to learn and/or predict user sentiments and to determine which in-game effects are preferred by each player for each of a plurality of types of game contexts. Further, machine learning is a sub-class of artificial intelligence, and deep learning is a sub-class of machine learning. As such, artificial intelligence is used to predict user sentiments for corresponding players and to automatically provide in-game effects preferred by each player to make the video game more interesting or intense when the user sentiment is unexpected for a current context in the game play.

Purely for illustration, the deep/machine learning engine 190 may be configured as a neural network used to train and/or implement the AI model 135, in accordance with one embodiment of the disclosure. Generally, the neural network represents a network of interconnected nodes responding to input (e.g., extracted features) and generating an output (e.g., learn gaming usage and/or play behavior of users and providing a recommendation). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 135.

Figure 2:
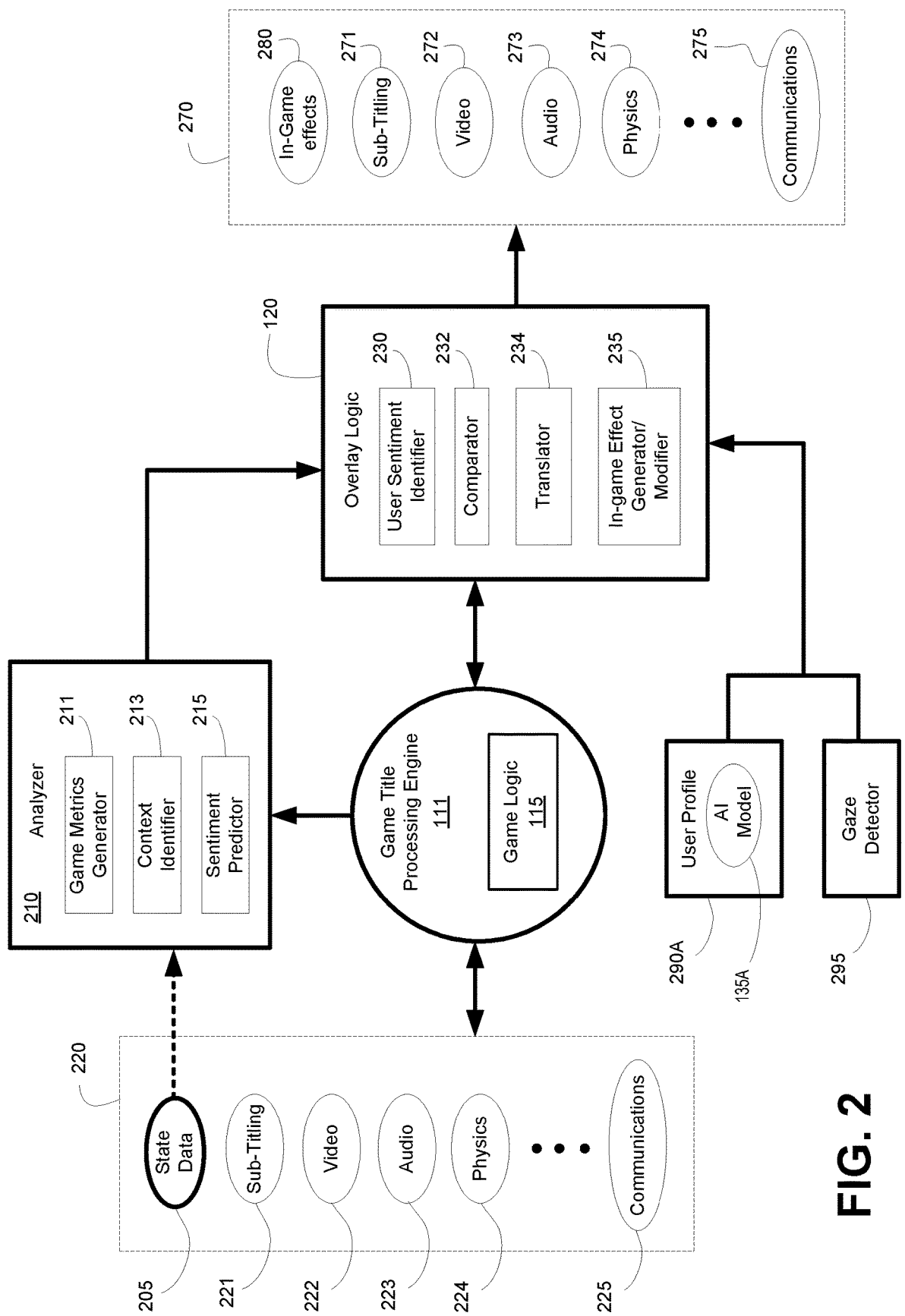
FIG. 2 illustrates overlay logic supporting a game engine to detect user sentiment during game play of a video game and automatically provide in-game effects to make the video game more interesting or intense when the user sentiment is unexpected for a current context, in accordance with one embodiment of the disclosure.

FIG. 2 illustrates overlay logic 120 supporting a game engine to detect user sentiment during game play of a video game and automatically provide in-game effects to make the video game more interesting or intense when the user sentiment is unexpected for a current context, in accordance with one embodiment of the disclosure. As shown, the overlay logic 120 supports a game title processing engine 111 that is executing game logic 115 of a corresponding video game, such as in support of game play of a corresponding player associated with user profile 290A and AI model 135A. As previously described, the game engine 111 when executing the game logic is configured to perform game calculations, physics, geometry transformations, rendering, lighting, shading, audio, as well as additional in-game or game-related services. For example, the game engine 111 is configured to provide output 220 including, in part, sub-titling 221, video 222, audio 223, physic 224, communications 225 (in game communications with other players), etc., as previously described.

In addition, the game engine 111 is configured for generating game state data 205 wherein game state data defines the state of an executing video game at that point. For example, game state data may include game characters, game objects, game object attributes, game attributes, game object state, graphic overlays, in-game effects generated for one or more video frames, etc. In that manner, game state data allows for the generation of the gaming environment (e.g., including in-game effects, etc.) that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point.

Analyzer 210 is in communication with the game engine 111. For example, output 220 is delivered to analyzer for further processing. In particular, game state data 205 is delivered to analyzer 210 for processing by the game metric generator 211, context identifier, 213 and sentiment predictor 215.

Game metrics generator 211 is configured to process the game state data 205 and provide additional information (e.g., game metrics) that can be used by overlay logic 120. For example, the game metrics may include the number of lives of a character, the number of attempts to complete a task, how long the player takes within a scene, progress of a game play of a video game, and other information.

Also, context identifier 213 is configured to process the game state data 205 and determine a current game context of a corresponding game play of a corresponding video game. For example, the context identifier may compare and analyze the game state data of the current game play against previously collected game state data and previous determinations of game contexts in order to determine the current game context. That is, the game state data of a corresponding game play may be used and compared with previously collected game state data corresponding to known game contexts to determine the current game context of the corresponding game play.

Further, sentiment predictor 215 is configured to process the game state data 205 and determine a predicted user sentiment for a current game context that is identified. For example, the current game context of a scene of a game play of a video game may be a chaotic battle scene that includes explosions and enemy combatants attacking a character. As such, the scene is intended to convey and/or trigger a sense of urgency in the corresponding player. This sense of urgency may define at least one part of a user sentiment of the player for the current game context. Other user sentiments may be defined for various game contexts. As such, the sentiment predictor is configured to process the current game context and determine a predicted user sentiment that the player should be exhibiting and/or feeling during the game play.

User profile 290A corresponds with the player playing the video game in a game play. As shown, the user profile 290A may include the corresponding AI model 135A and/or parameters defining the AI model 135A, as previously described. For example, information in the user profile is delivered to the overlay logic 120 for further processing. In one embodiment, the user profile 290A is used to help identify a user sentiment of the player for a current game context that has previously been identified.

In addition, gaze detector 295 is configured to collect information related to a face and/or body of the player. For example, gaze detector collects facial information of the player during the game play. This facial information, in combination with or independent of other information (e.g., user profile information), may be processed by the overlay logic 120 for processing, in part, to determine a user sentiment of the player during the game play for a current game context that has previously been identified.

As shown and previously described, overlay logic 120 supports the game engine 111. In particular, game state data 205 is delivered to and/or accessed by the overlay logic (e.g., as represented by path 280) for analysis to detect user sentiment for a current context of a game play of a video game, and to automatically provide in-game effects to convey the proper sentiment for the current context when the user sentiment is unexpected (e.g., the player is not understanding what is occurring in the video game), such as to make the video game more interesting or intense. The overlay logic 120 includes a user sentiment identifier 230, a comparator 232, a translator 234, and in-game effect generator/modifier 235.

In particular, the overlay logic 120 may be configured to provide additional functionality in support of the game engine 111. That is, additional elements may be generated by the overlay logic and provided in support of and/or in conjunction with the video frames that are generated by the game engine 111 when executing game logic 115 of a video game. For example, the overlay logic 120 may provide as output 270 these additional elements including, in part, additional in-game effects 280, additional sub-titling 271, video 272, audio 273, physic 274, communications 275 (in game communications with other players), etc.

In one implementation, based on one or more pieces of information obtained from the analyzer 210, the user profile 290A, and gaze detector 295, the user sentiment identifier 230 of the overlay logic 120, based on rules or implementation of the AI model 135A, is configured to identify the user sentiment for a current context of a video game during game play of the user. For example, user sentiment includes an understanding of what is occurring in the game play of the video game, or general opinion or feeling or emotion of the player during the game play of the video game. In particular, user sentiment identifier 230 analyzes the information from the gaze detector 295 to determine facial features of the player, which are processed to determine the user sentiment.

In addition, user sentiment identifier analyzes and processes the information (e.g., game metrics) from the game metrics generator 211 to determine the user sentiment for the current context. In particular, the game metrics and/or game state data of the current game play is analyzed in order to determine a progress in the game play of the player. For example, analysis of the game state data and/or game metrics may indicate that the user is playing poorly (i.e., not advancing the game play) through a section of the game occurring during the current context. In addition, analysis of game state data and/or game metrics may indicate that a character controlled by the player is not acting in a predicted manner. For instance, the analysis includes identifying one or more actions of the character, and determining that the character is inconsistent with the current context. As an illustration, the character should be proceeding through a doorway, or locating an object for possession, but the game metrics indicate that those actions are not occurring in the game play. As such, the user sentiment of the player may indicate that the user is confused and is not understanding what exactly is occurring during the game play of the video game. For illustration, in order to progress through the video game a task (obtain an object, go through a door, etc.) must be completed in the current context; however, the player does not understand this task and instead is wandering around aimlessly without advancing the game.

In one embodiment, the user sentiment identifier 290A may implement the AI model 135A of the user profile 290A for processing the one or more pieces of information obtained from the analyzer 210, the user profile 290A, and gaze detector 295 to identify the user sentiment. For example, the is AI model 135A may be implemented to determine the facial features of the player, and to process those facial features to determine a user sentiment consistent with the facial features that are identified. For example, the AI model may collect a plurality of gazes of the player while playing a plurality of video games. The plurality of gazes is processed to identity facial features that are labeled and classified for propagation through a deep learning engine to build the AI model of the player, wherein the AI model is configured to identify the user sentiment of the player. In particular, the AI model is configured to detect and/or identify the gaze and/or facial features of the player, and further to process that information to identify the user sentiment of the player. The AI model 135A may also be implemented to process the game metrics from generator 211 in order to determine user sentiment, as previously described. As such, the AI model 135A is able to process one or more pieces of the information from the analyzer, user profile 290A, and gaze detector in order to determine the user sentiment.

Also, the comparator 232 of the overlay logic is configured to compare the user sentiment of the player for the current context (i.e., as determined by the user sentiment identifier 230) with the predicted user sentiment from predictor 215 of the analyzer 210. When the user sentiment identified (i.e., for the current context of the game play) does not align with the predicted user sentiment, this may indicate that the player does not fully understand what is occurring in the video game for the game play. Additional actions may be performed by overlay logic 120 to remedy this misalignment, such as those performed by the in-game effect generator/modifier 235 and/or the translator 234.

For instance, the in-game effector generator/modifier 235 is configured to modify an effect that is generated during execution of the video game for the game play of the player. For instance, a hearing impaired player may turn ON sub-titling features. The player may not fully understand what is trying to be communicated with the sub-titling as the game may be moving too quickly, or the sub-titling may be too wordy, or the player is overwhelmed with trying to read the sub-titling and play the video game, etc.

As such, the in-game effector generator/modifier 235 may modify the sub-titling to better communicate to the player what is intended by the set-up-titling. For example, the text of the sub-titling may be modified, including changing the font, making the text larger, changing the color of the text, modify the formatting of the text of the sub-titling, highlighting the text or window used for sub-titling, etc. In this manner, the attention of the player may be actively directed to the sub-titling.

Also, the in-game effector generator/modifier 235 may generate new in-game effects to be displayed with video frames of the game play associated with the current context. For instance, the sub-titling may be highlighted, as previously introduced. In addition, the sub-titling may be moved within the scene displayed in the game play, such that the sub-titling moves forward and backwards between vertical planes in the scene, or side to side or diagonally within a horizontal plane of the scene, or any other movement intended to bring attention of the player to the sub-titling. In addition, the in-game effector generator/modifier 235 may generate animation for the current context, including emoticons or animated emoticons, or animation, or graphical user interfaces, that better convey to the user the proper user sentiment.

Further, the translator 234 of the in-game effector generator/modifier 235 may generate new text for the sub-titling or generate a new sub-title when no sub-titling was presented before. For example, the generator 234 is configured to generate new text for a current sub-titling for the current game context, such as when the user sentiment indicates that the player is confused or not gaining the full experience (e.g., a sense of urgency, or heightened fear, etc.) from playing the video game. As an illustration, the new sub-titling may be more concise and replace the old sub-titling or be newly presented in the scene of the current game context. The new-subtitling better conveys to the user the proper user sentiment for the current game context. In addition, the translator 234 may be configured to translate the old sub-titling in order to understand what that sub-titling is trying to convey to the player. In that manner, the translator 234 may be able to generate or determine an appropriate in-game effect for the old sub-titling. For example, the translator 234 may translate the sub-titling to an emoticon, or animated emoticon, or animation, or graphic user interface, or new text, etc., which is presented in the scene of the game play.

Figure 3:
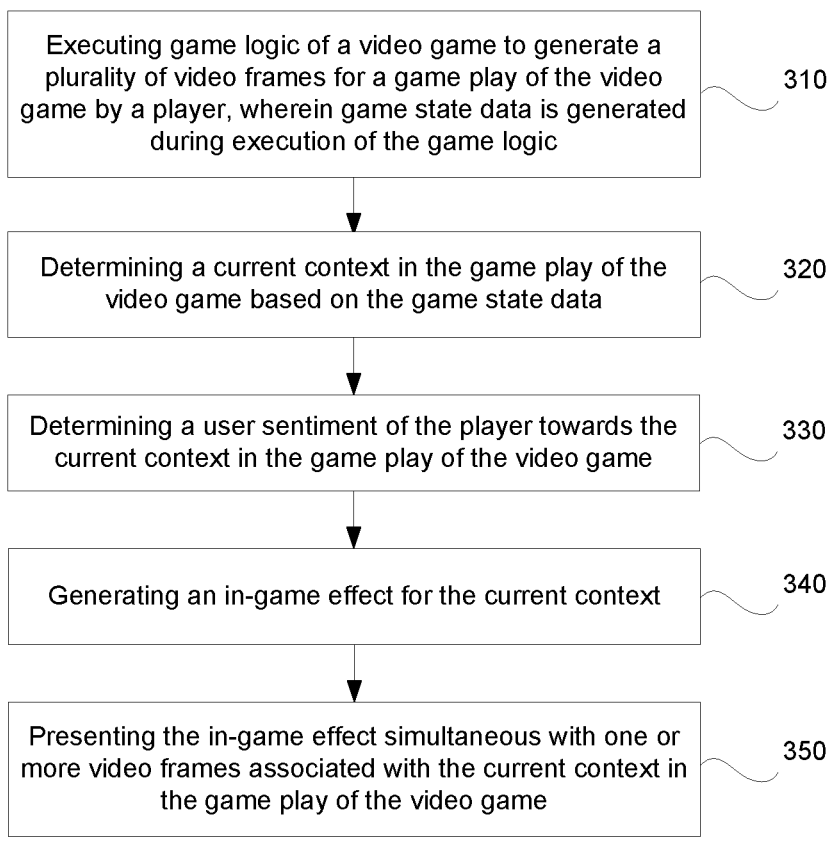
FIG. 3 is a flow diagram illustrating steps in a method configured for overlay logic supporting a game engine to detect user sentiment during game play of a video game and provide in-game effects that automatically convey to a player the proper sentiment for a current context during game play of a video game by a player when the detected user sentiment is unexpected for a current context, in accordance with one embodiment of the disclosure.

With the detailed description of the system 100 of FIG. 1 and the overlay logic 120 of FIG. 2, flow diagram 300 of FIG. 3 is a flow diagram 300 illustrating steps in a method configured for overlay logic supporting a game engine to detect user sentiment during game play of a video game and provide in-game effects that automatically convey to a player the proper sentiment for a current context during game play of a video game by a player when the detected user sentiment is unexpected for a current context, in accordance with one embodiment of the disclosure. The operations performed in flow diagram 300 may be implemented by one or more of the previously described components, and also system 100 described in FIGS. 1 and 2, including overlay logic 120. In particular, the method of flow diagram 300 may be implemented in order to provide alternative avenues for conveying to the player the proper sentiment or understanding for the current context encountered during the game play, such as through in-game effects that are presented within a scene but are not normally generated during execution of the video game. For example, the in-game effects can include the modification and/or generation of sub-titles, new animation, translation of sub-tiling to an emoticon or animation, etc. In that manner, the impaired player is able to enjoy a game experience and/or understanding of the current context of a video game during a game play that is similar to the game experience and/or understanding of a non-impaired player. For illustration, a hearing impaired player that has difficulty in hearing sound effects and/or reading sub-titling generated by a corresponding video game can gain the same gaming experience and/or understanding of a current game context through modification and/or generation of corresponding in-game effects that is similar to the game experience and/or understanding of a non-impaired player.

At 310, the method includes executing game logic of a video game to generate a plurality of video frames for a game play of the video game by a player. For example, a game engine is configured to execute the game logic of a corresponding video game in support of the game play. During execution of the game logic, game state data is also generated. As previously described, game state data defines the state of an executing video game at that point, and in part, game state data allows for the generation of the gaming environment that existed at the corresponding point in the video game. For example, the game state data may be analyzed to generate game metrics, and further analyzed to determine user sentiment of a player for a current context of game play, and to determine an appropriate in-game effect that is presented in a scene of the game play in association with the current context.

At 320, the method includes determining a current context in the game play of the video game based on the game state data. For example, the game state data of the current game play may be analyzed and compared against previous game state data of other game plays of the video game (e.g., by a plurality of players) to determine the current game context. that is, the game state data of the current game context should align with previous game state data of previous game plays, and previous determinations of game context for those game plays.

At 330, the method includes determining a user sentiment of the player towards the current context in the game play of the video game. For example and as previously described, the user sentiment of the player may be determined through analysis of game state data, game metrics, information from the gaze detector 295, user profile 290A, and/or the implementation of AI model 135A. For example, game metrics for the game play that is based on the game state data may be analyzed to determine a progress in the game play of the video game by the player. The analysis may determine that the progress in the game play is poor (i.e., the player is not advancing through the video game as expected). As such, it may be determined that the user sentiment indicates that the player is confused and/or not understanding fully what is occurring the video game. In another example, one or more actions of a character controlled by the player in the game play of the video game is analyzed to determine that the actions are inconsistent with the current context. For example, the character is not acting as expected, which indicates that the player is confused and/or and the player is confused not understanding fully what is occurring the video game. For illustration, the player may not understand that to advance the game play in the current context, it is necessary to pick up and/or obtain an object (e.g., the player is not picking up an axe in the scene).

As previously described, an AI model of the player may be implemented to determine the user sentiment for the current game context. In particular, the AI model is built by collecting a plurality of gazes of the player while playing a plurality of video games. The gazes are input into a deep learning engine and processed to identify facial features that are labeled and classified for propagation through the deep learning engine to build the AI model of the user. The AI model is configured to predict a plurality of user sentiments of the user. For example, during implementation of the AI model, information from a gaze detector is input into and processed by the AI model to identify the user sentiment of the player.

At 340, the method includes determining that the user sentiment of the player is inconsistent with an expected user sentiment for the current context. As previously described, a predicted user sentiment may be determined based on the current game context and game state data. That is, previous game plays of a plurality of players may help to identify user sentiments that correspond to particular game contexts within the video game. In addition, the predicted user sentiment may be coded into the video game by the developer. The predicted user sentiment for the current game context is compared against the identified user sentiment of the player for the current game context in the game play of the player. As such, the method can determine when the user sentiment of the player that is identified for the current game context does not align with the predicted user sentiment. Misalignment may indicate that the player confused and/or not understanding fully what is occurring the video game.

At 350, the method includes generating an in-game effect for the current context. That is, when it is determined that user sentiment of the player is inconsistent with an expected user sentiment for the current context, additional action may be taken to remedy this misalignment to include generating an in-game effect, as previously described. The in-game effect is presented simultaneous with one or more video frames associated with the current context in the game play of the video game.

For illustration, FIGS. 4A-4D are exemplary illustrations of various techniques providing in-game effects to convey to a player the proper sentiment for a current context during game play of a video game by a player, in accordance with embodiments of the present disclosure. Screen shots 400A of FIG. 4A, 400B of FIG. 4B, 400C of FIGS. 4C and 400D of FIG. 4D each show a scene 403 that includes a soldier or character 405 walking through a forested area. One or more video frames of the scene 403 are intended by the video game to convey a sense of urgency in a corresponding player playing the video game, such as when participating in a battle, or experiencing a sense of heightened danger with the anticipation of enemy combatants just off screen, etc. An impaired player (e.g., hearing impaired, or one unwilling or unable to process lots of information presented within the video game, etc.) may not experience the full sense of urgency in the current game context of the game play. That is, the player may be confused and/or not understanding fully what is occurring the video game. In some embodiments, an AI model of a corresponding player is implemented to determine user sentiment of the player during a current game context, and also to determine the preferred in-game effect to be displayed in association with the current game context in the game play of the player of a video game.

Figure 4A:
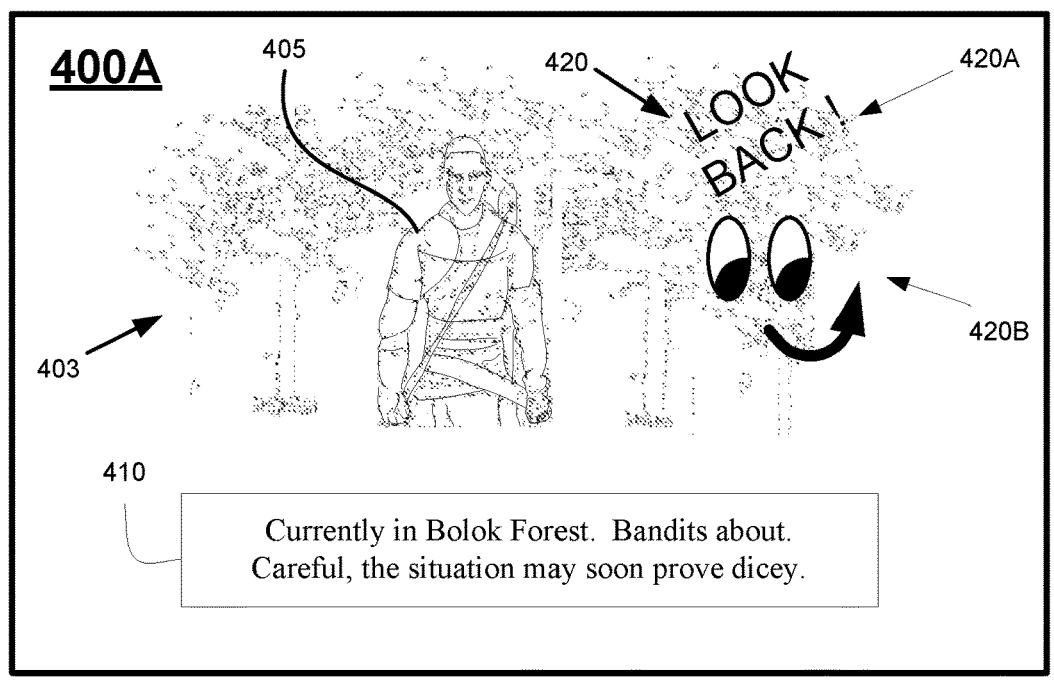
FIGS. 4A-4D are exemplary illustrations of various techniques to convey to a player the proper sentiment for a current context during game play of a video game by a player, in accordance with embodiments of the present disclosure.

For example, in the screen shot 400A of FIG. 4A the sub-titling 410 may be generated by the video game during execution thereof. The sub-titling may be inadequate to convey to the player the full experience of the current game context. In particular, the sub-titling 410 may be cumbersome to read, and furthermore may appear to be bland to the reader. In other words, the sub-titling 410 may be too straight forward (e.g., "Currently in Bolok Forest . . . "), and as such does not generate any emotion or at least the proper emotion in the player. In that case, additional in-game effects 420 may be presented to the player within the scene 103. For instance, the original effects of the scene are intended to trigger and/or convey a sense of urgency in the player as there may be incoming ordinance or enemy combatants, especially from the rear of the character 403. In particular, additional text 420A that is bolded, tilted, and in large font (i.e., "LOOK BACK !") is presented to the player in a manner to bring quick attention and understanding of the severity and seriousness of the current game context to the player. In addition to, or independent of, the text 420A, an additional in-game effect 420B (e.g., emoticon or icon, or animation) may be presented to communicate the proper user sentiment to the player. The in-game effect 420B may be designed to give the player at one glance an understanding of the situation in the current game context. For example, large eyes and an arrow pointing backwards may convey to the player that danger is imminent and it is prudent to look backwards. Additional in-game effects may include modifying a color of text of the sub-title 410; and modifying a format of the text of the sub-title 410; and highlighting the sub-title 410; and moving the sub-title 410 within a scene displayed in the one or more video frames.

Figure 4B:
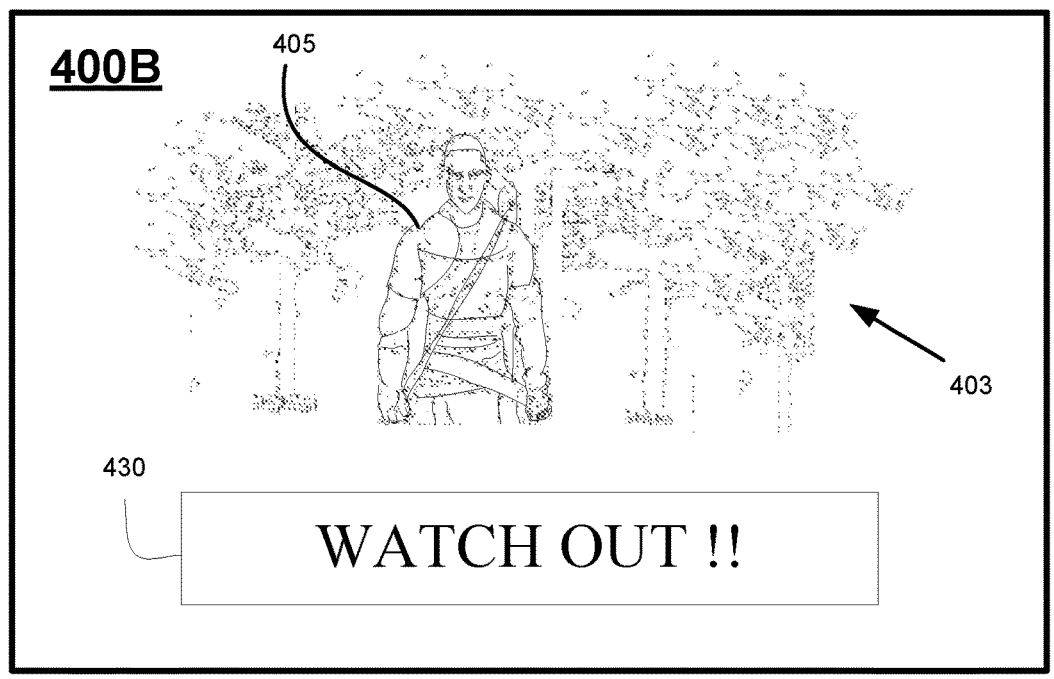

The screen shot 400B of FIG. 4B illustrates an in-game effect that includes the generation of new text for the sub-title for the current game context. In particular, new text that may better convey to the player the proper user sentiment for the current context may be generated. For example, the new text may just include the wording "WATCH OUT !!" that is bolded and enlarged. This new text is sufficient to convey to the player a sense of danger and urgency in the current game context. As shown, the new text in sub-titling 430 replaces the old text in sub-titling 410 of FIG. 4A, wherein the sub-titling 430 is now displayed within the scene 403 in the one or more video frames associated with the current game context.

In some embodiments, the in-game effect includes translating text of the sub-title 410 shown in FIG. 4A to a newly generated in-game effect, as previously described. The newly generated in-game effect is presented in one or more video frames in the game play of the video game in association with the current game context. For example, the newly generated in-game effect includes an emoticon, an animated emoticon, an animation, a graphical user interface, newly generated text, and etc. In general, the newly generated in-game effect is able to better convey the proper sentiment to the player for the current context during game play of the corresponding video game. In addition to the newly generated in-game effects presented in FIGS. 4A-4B, other examples of newly generated in-game effects are presented in FIGS. 4C and 4D.

Figure 4C:
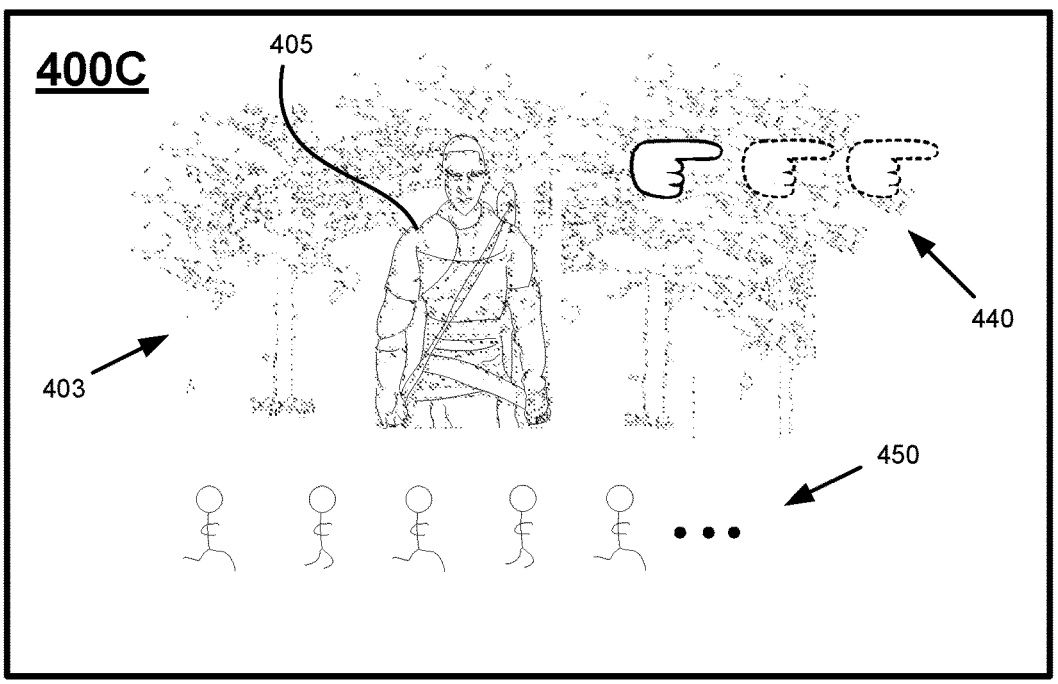

In particular, FIG. 4C shows screen shot 400C which includes one or more examples of in-game effects that are animated. For example, scene 403 is intended to convey a sense of urgency as a user sentiment in the player. To that end, animation 440 is an animation 440 that includes a moving hand that is pointing to the right side of the display, which may be repeated. Animation 440 is trying to communicate to the player to move the character 405 in the direction of the moving hand, or to the left side of the character 405. Furthermore, an additional sense of urgency may be conveyed to the player using animation 450, wherein a running icon is shown moving or running across the bottom of the screen shot 400C. One or both of animation 440 and animation 450 may be presented within scene 403 to convey the proper sentiment to the player for the current game content in the game play of the player.

Figure 4D:
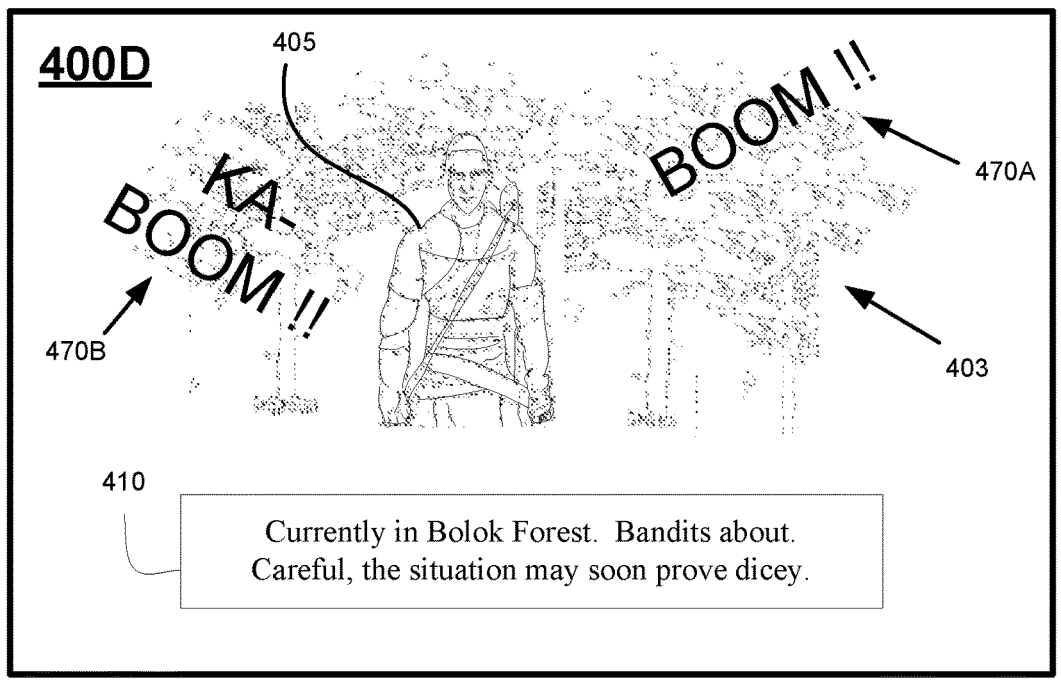

Furthermore, FIG. 4D shows screen shot 400D which includes additional in-game effects 470A and 470B. For instance, a translator (e.g., translator 234) may be configured to translate the text of sub-titling 410. The translation is intended to determine what the sub-titling 410 is trying to communicate to the player and/or the proper sentiment to convey to the player. For example, sound effects may be occurring and generated by the video game in the scene 403 which are not heard by a hearing impaired player. Those sound effects may include explosions that are occurring throughout the background of scene 403, and are intended to convey a sense of danger (incoming enemy combatants or ordinance) and urgency (e.g., to get out of there). However, the hearing impaired player may not fully understand or understand what is occurring in the scene 403. As such, additional in-game effects are provided to convey to the player the proper user sentiment. For example, in-game effect 470A may be an icon or text ("BOOM !!") that is trying to communicate to the player an explosion is occurring to the left side of the character 405. The in-game effect 470A may include or be represented by an animated explosion or any other effect that indicates an explosion is occurring in that portion of the scene 403. Also, in-game effect 470B may be an icon or text ("KA-BOOM !!") that is also trying to communicate to the player an explosion is occurring to the right side of the character 405. In that manner, in-game effects 470A and 470B may be displayed in the one or more video frames of the scene 403 to communicate to the player that multiple explosions over a period of time are occurring in the scene 403, and that the player should have a sense of urgency or be aware of a dangerous situation in the current game context of the game play of the video game.

In another embodiment, a video game may include effects (e.g., sub-titling) that are ineffective in conveying to a player the proper user sentiment. For example, as previously described, sub-titling as an effect may be bland or too wordy for the player to comprehend what is being communicated. A player that is playing the video game may provide to a back-end server and/or system, acting as a collector of recommendations and/or user comments, a new effect, such as a new and/or revised sub-titling. After review, the suggested sub-titling may be used within the video game (e.g., through a software patch) for subsequent game plays by one or more various players. The system may then provide to the player providing the suggestion an award (e.g., trophy, or player identifier promoting the player as an expert or community helper that assisted in translating sub-titling in the video game, or exclusive content associated with the video game, etc.).

Figure 5:
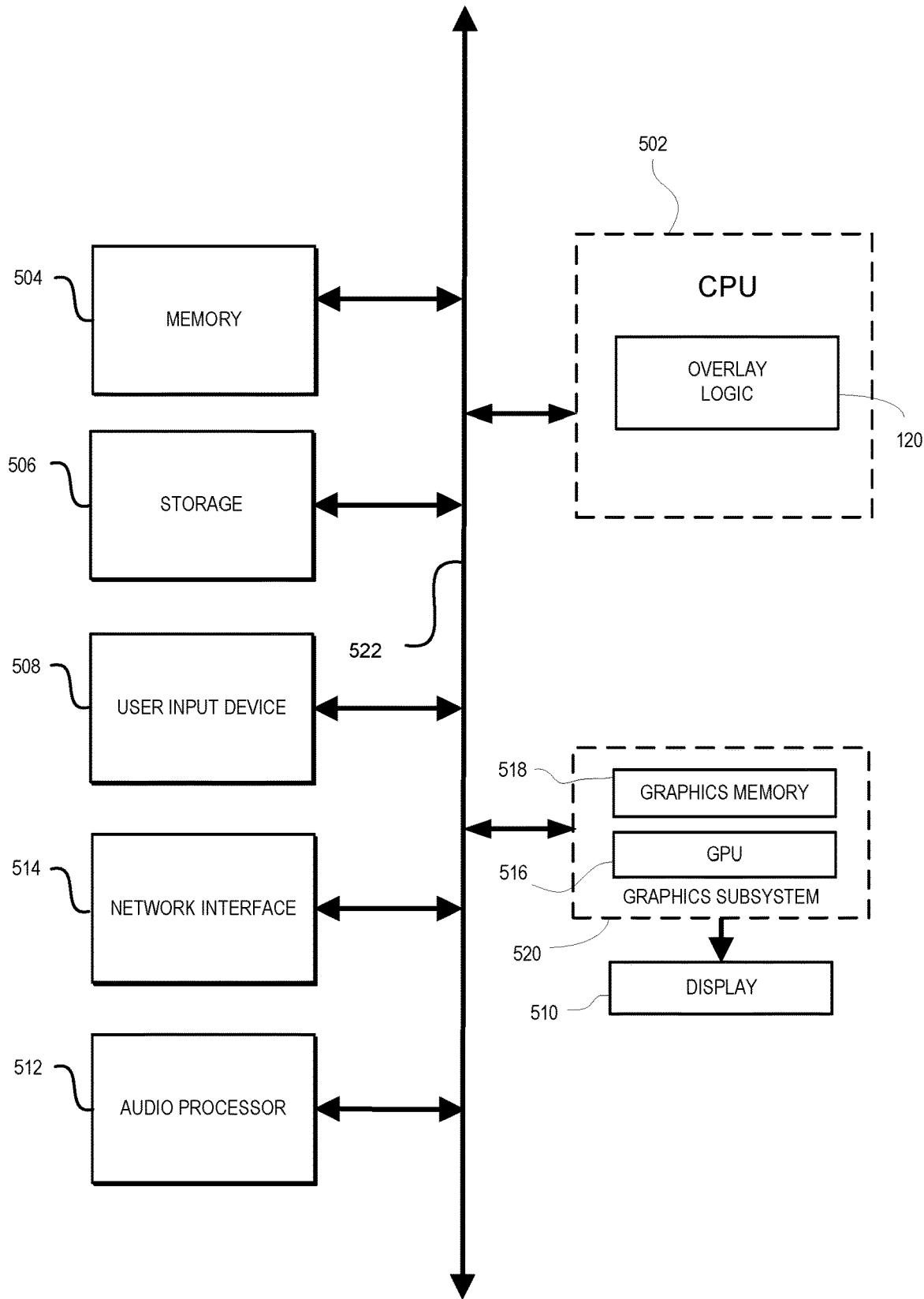
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement overlay logic 120 with functionality configured to detect user sentiment during game play of a video game and provide in-game effects that automatically convey to a player the proper sentiment for a current context during game play of a video game by a player when the detected user sentiment is unexpected for a current context. In some embodiments, the overlay logic is configured to build and/or implement artificial intelligence models configured to predict user sentiments for corresponding players, and/or to determine which in-game effects are preferred by each player. In that manner, a player that may be impaired in receiving an intended gaming experience and/or understanding when playing a video game for a current context, through modification and/or generation of in-game effects, may enjoy a game experience that is similar to the game experience of a non-impaired player hearing the sound effect, including conveying to an impaired player what is occurring during the corresponding game play of the video game. For example, the in-game effects are configured to make the video game more interesting or intense when the user sentiment is unexpected for a current context in the game play.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for providing overlay logic supporting a game engine to detect user sentiment during game play of a video game and provide in-game effects that automatically convey to a player the proper sentiment for a current context during game play of a video game by a player when the detected user sentiment is unexpected for a current context. Also, various embodiments enable the overlay logic to build and/or implement artificial intelligence models configured to predict user sentiments for corresponding players, and/or to determine which in-game effects are preferred by each player.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include 5th Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera and/or system that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc. In addition, the gaze tracking system may be configured to capture facial features of the user for purposes of analysis to determine user sentiment when playing a video game.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
executing game logic of a video game to generate a plurality of video frames for a game play of the video game by a player, wherein game state data is generated during the executing the game logic;
determining a current context for a current point in the game play of the video game based on the game state data;
determining a user sentiment of the player towards the current context in the game play of the video game;
determining that the user sentiment of the player is inconsistent with an expected user sentiment for the current context;
automatically generating an in-game effect for the current context;
presenting the in-game effect simultaneous with one or more video frames associated with the current context in the game play of the video game;
collecting a plurality of gazes of the player while playing a plurality of video games; and
processing the plurality of gazes to identify facial features that are labeled and classified for propagation through a deep learning engine to build an AI model of the user configured to predict a plurality of user sentiments of the user.

2. The method of claim 1, wherein the determining the user sentiment includes:
analyzing a plurality of game metrics for the game play based on the game state data;
determining a progress in the game play of the video game; and
determining that the progress is poor.

3. The method of claim 1, wherein the determining the user sentiment includes:
identifying one or more actions of a character controlled by the player in the game play of the video game; and
determining that the one or more actions are inconsistent with the current context.

4. The method of claim 1, wherein the determining the user sentiment includes:
detecting a gaze of the player; and
executing the AI model to identify the user sentiment of the player.

5. The method of claim 1, wherein the generating the in-game effect includes at least one of the following:
modifying a color of text of a sub-title; and
modifying a format of the text of the sub-title; and
highlighting the sub-title; and
moving the sub-title within a scene displayed in the one or more video frames.

6. The method of claim 1, wherein the generating the in-game effect includes:
generating new text for a sub-title for the current context;
replacing old text of the sub-title with the new text for the sub-title; and
displaying the sub-title with the new text within a scene displayed in the one or more video frames.

7. The method of claim 1, further comprising:
translating text of a sub-title displayed in the one or more video frames to the in-game effect; and presenting the in-game effect in the one or more video frames.

8. The method of claim 7, wherein the in-game effect includes at least one of:
an emoticon; and
an animation; and
a graphical user interface; and
the text.

9. A non-transitory computer-readable medium storing a computer program for performing a method, the computer-readable medium comprising:
program instructions for executing game logic of a video game to generate a plurality of video frames for a game play of the video game by a player, wherein game state data is generated during the executing the game logic;
program instructions for determining a current context for a current point in the game play of the video game based on the game state data;
program instructions for determining a user sentiment of the player towards the current context in the game play of the video game;
program instructions for determining that the user sentiment of the player is inconsistent with an expected user sentiment for the current context;
program instructions for automatically generating an in-game effect for the current context;
program instructions for presenting the in-game effect simultaneous with one or more video frames associated with the current context in the game play of the video game;
program instructions for collecting a plurality of gazes of the player while playing a plurality of video games; and
program instructions for processing the plurality of gazes to identify facial features that are labeled and classified for propagation through a deep learning engine to build an AI model of the user configured to predict a plurality of user sentiments of the user.

10. The non-transitory computer-readable medium of claim 9, wherein the program instructions for determining the user sentiment includes:
program instructions for analyzing a plurality of game metrics for the game play based on the game state data;
program instructions for determining a progress in the game play of the video game; and
program instructions for determining that the progress is poor.

11. The non-transitory computer-readable medium of claim 9, wherein the program instructions for determining the user sentiment includes:
program instructions for detecting a gaze of the player; and
program instructions for executing the AI model to identify the user sentiment of the player.

12. The non-transitory computer-readable medium of claim 9, wherein the program instructions for generating the in-game effect includes at least one of the following:
program instructions for modifying a color of text of a sub-title; and
program instructions for modifying a format of the text of the sub-title; and
program instructions for highlighting the sub-title; and
program instructions for moving the sub-title within a scene displayed in the one or more video frames.

13. The non-transitory computer-readable medium of claim 9, further comprising:

program instructions for translating text of a sub-title displayed in the one or more video frames to the in-game effect; and
program instructions for presenting the in-game effect in the one or more video frames.

14. The non-transitory computer-readable medium of claim 13, wherein the in-game effect in the program instructions includes at least one of:
an emoticon; and
an animation; and
a graphical user interface; and
the text.

15. A computer system comprising:
a processor;
memory coupled to the processor and having stored therein instructions that, if executed by the computer system, cause the computer system to execute a method, comprising:
executing game logic of a video game to generate a plurality of video frames for a game play of the video game by a player, wherein game state data is generated during the executing the game logic;
determining a current context for a current point in the game play of the video game based on the game state data;
determining a user sentiment of the player towards the current context in the game play of the video game;
determining that the user sentiment of the player is inconsistent with an expected user sentiment for the current context;
automatically generating an in-game effect for the current context;
presenting the in-game effect simultaneous with one or more video frames associated with the current context in the game play of the video game;
collecting a plurality of gazes of the player while playing a plurality of video games; and
processing the plurality of gazes to identify facial features that are labeled and classified for propagation through a deep learning engine to build an AI model of the user configured to predict a plurality of user sentiments of the user.

16. The computer system of claim 15, wherein in the method the determining the user sentiment includes:
analyzing a plurality of game metrics for the game play based on the game state data;
determining a progress in the game play of the video game; and
determining that the progress is poor.

17. The computer system of claim 15, wherein in the method the determining the user sentiment includes:
detecting a gaze of the player; and
executing the AI model to identify the user sentiment of the player.

18. The computer system of claim 15, wherein in the method the generating the in-game effect includes at least one of the following:
modifying a color of text of a sub-title; and
modifying a format of the text of the sub-title; and
highlighting the sub-title; and
moving the sub-title within a scene displayed in the one or more video frames.

19. The computer system of claim 15, the method further comprising:
translating text of a sub-title displayed in the one or more video frames to the in-game effect; and presenting the in-game effect in the one or more video frames,
wherein the in-game effect includes at least one of:
  an emoticon; and
  an animation; and
  a graphical user interface; and
the text.

* * * * *